(12) United States Patent
Tian et al.

(10) Patent No.: US 11,374,726 B2
(45) Date of Patent: Jun. 28, 2022

(54) METHOD AND TESTBED SYSTEM FOR EMULATING A COMMUNICATION SYSTEM WITH FAST CHANGING LINK CONDITION

(71) Applicant: INTELLIGENT FUSION TECHNOLOGY, INC., Germantown, MD (US)

(72) Inventors: Xin Tian, Germantown, MD (US); Genshe Chen, Germantown, MD (US); Khanh Pham, Kirtland AFB, NM (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 69 days.

(21) Appl. No.: 16/924,853

(22) Filed: Jul. 9, 2020

(65) Prior Publication Data
US 2022/0014347 A1    Jan. 13, 2022

(51) Int. Cl.
| | |
|---|---|
| *H04L 5/12* | (2006.01) |
| *H04L 5/14* | (2006.01) |
| *H04L 25/02* | (2006.01) |
| *H04B 17/391* | (2015.01) |
| *H04B 17/373* | (2015.01) |
| *H04L 25/03* | (2006.01) |

(52) U.S. Cl.
CPC ......... *H04L 5/1453* (2013.01); *H04B 17/373* (2015.01); *H04B 17/3913* (2015.01); *H04L 25/0204* (2013.01); *H04L 25/03343* (2013.01); *H04L 2025/03401* (2013.01)

(58) Field of Classification Search
CPC ..... H04L 1/0054; H04L 1/005; H04L 1/0041; H04L 25/0272; G06F 11/1072
USPC ......................... 375/262, 260, 295, 298, 308
See application file for complete search history.

(56) References Cited

U.S. PATENT DOCUMENTS

| | | | | |
|---|---|---|---|---|
| 2006/0285580 | A1* | 12/2006 | Kinnunen | H04B 1/70751 375/147 |
| 2008/0232435 | A1* | 9/2008 | Wilson | H04L 27/02 375/143 |
| 2010/0174969 | A1* | 7/2010 | Ashe | H03M 13/6343 714/781 |

* cited by examiner

*Primary Examiner* — Khai Tran
(74) *Attorney, Agent, or Firm* — Anova Law Group, PLLC

(57) ABSTRACT

A method for emulating a communication system with fast changing link condition, applied to a testbed system including an interference emulator, a transmitter, and a receiver, includes: by the transmitter, generating code-word symbols, in an initial symbol sequence, according to information bits; evaluating an interference condition and a time duration for each code-word symbol; reordering the code-word symbols to a reordered symbol sequence based on interference conditions; evaluating a total time duration of code-word symbols under each interference condition; and transmitting the code-word symbols in the reordered symbol sequence. The method also includes: by the interference emulator, obtaining the total time duration of code-word symbols under each interference condition from the transmitter; and providing an emulated interference environment by ordering the time durations of different interference conditions. The start time for transmitting code-word symbols with an interference condition is synchronized with the start time for emulating the interference condition.

16 Claims, 5 Drawing Sheets

METHOD AND TESTBED SYSTEM FOR EMULATING A COMMUNICATION SYSTEM WITH FAST CHANGING LINK CONDITION

GOVERNMENT RIGHTS

This invention was made with Government support under Contract No. FA945314C0017, awarded by the United States Air Force. The U.S. Government has certain rights in this invention.

FIELD OF THE DISCLOSURE

The disclosure generally relates to the field of satellite communication (SATCOM) technology, more particularly, relates to a method and a testbed system for emulating a communication system with fast changing link condition.

BACKGROUND

Frequency Hopping (FH) communication is a technology of spread spectrum communication that has strong anti-interference, anti-interception and security capabilities. In a FH communication system, the center (carrier) frequency of a pair of transmitter and receiver changes over a spectrum band over time. The communication time is divided into hops where each hop corresponds to a small fixed time duration. Over a hop, frequency band used by the transmitter and receiver pair remains the same.

The FH communication technology is widely applied to satellite communication (SATCOM). However, because of the highly complex dynamic environment and the limited available physical resources, the performance regarding data rate, delay, and signal quality may not be easily obtained. Therefore, a comprehensive and accurate cognitive radio testbed designed for SATCOM is beneficial and necessary. In addition to investigating individual technology in SATCOM, a testbed can also provide an end-to-end evaluation from the system perspective by putting all the major components together.

The disclosed method and testbed system for emulating a communication system with fast changing link condition are directed to solving one or more problems set forth above and other problems in the art.

BRIEF SUMMARY OF THE DISCLOSURE

The present disclosure provides a method for emulating a communication system with fast changing link condition. The method is applied to a testbed system including an interference emulator, a transmitter, and a receiver. The method includes generating, by the transmitter, a plurality of code-word symbols according to information bits. The plurality of code-word symbols are ordered in an initial symbol sequence. The method further includes evaluating, by the transmitter, an interference condition and a time duration for each code-word symbol; reordering, by the transmitter, the plurality of code-word symbols to a reordered symbol sequence based on interference conditions; and evaluating, by the transmitter, a total time duration of code-word symbols under each interference condition. Code-word symbols with a same interference condition are arranged together in the reordered symbol sequence. The method further includes transmitting, by the transmitter, the plurality of code-word symbols in the reordered symbol sequence; obtaining, by the interference emulator, the total time duration of code-word symbols under each interference condition from the transmitter; and providing, by the interference emulator, an emulated interference environment by ordering time durations of different interference conditions in a sequence according to the reordered symbol sequence of the plurality of code-word symbols. The start time of transmitting, by the transmitter, code-word symbols with an interference condition is synchronized with the start time of emulating, by the interference emulator, the interference condition.

Another aspect of the present disclosure provides a testbed system for emulating a communication system with fast changing link condition. The testbed system includes a transmitter and a receiver, at least establishing a radio-frequency (RF) communication link, and an interference emulator. The transmitter is configured to generate a plurality of code-word symbols, ordered in an initial symbol sequence, according to information bits; evaluate an interference condition and a time duration for each code-word symbol; reorder the plurality of code-word symbols to a reordered symbol sequence based on interference conditions; and evaluate a total time duration of code-word symbols under each interference condition. Code-word symbols with a same interference condition are arranged together in the reordered symbol sequence. The transmitter is further configured to transmit the plurality of code-word symbols in the reordered symbol sequence. The interference emulator is configured to obtain the total time duration of code-word symbols under each interference condition from the transmitter; and provide an emulated interference environment by ordering time durations of different interference conditions in a sequence according to the reordered symbol sequence of the plurality of code-word symbols. The start time for the transmitter to transmit code-word symbols with an interference condition is synchronized with the start time for the interference emulator to emulate the interference condition.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

Figure 1:
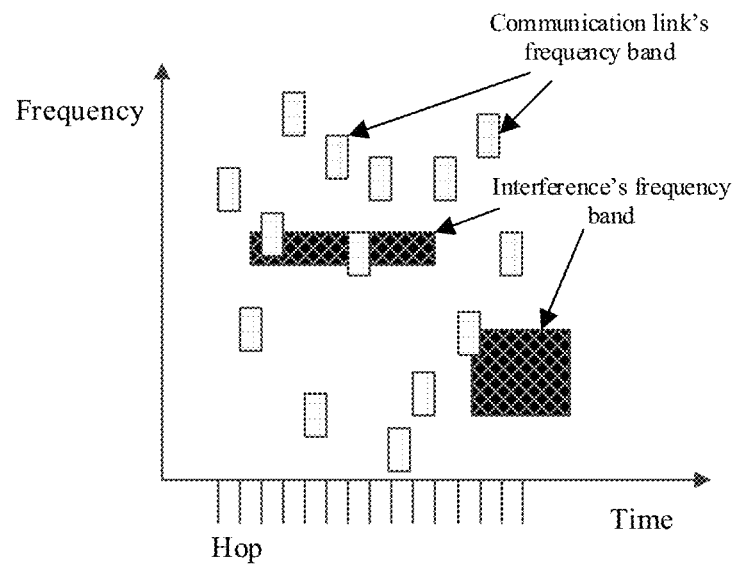
FIG. 1 illustrates a schematic time-frequency pattern of an FH communication link.

FIG. 1 illustrates a schematic time-frequency pattern of an FH communication link. Referring to FIG. 1, a FH communication system operates in a radio-frequency (RF) environment where intended/unintended interferences exist. During the operation, an interference only affects the communication link when the interference's frequency band overlaps with the communication link's frequency band. Therefore, the FH communication system has enhanced capability in operating in the RF environment since only a small portion of the hops will be affected by the interferences (over hops when their frequency bands overlaps).

Figure 2:
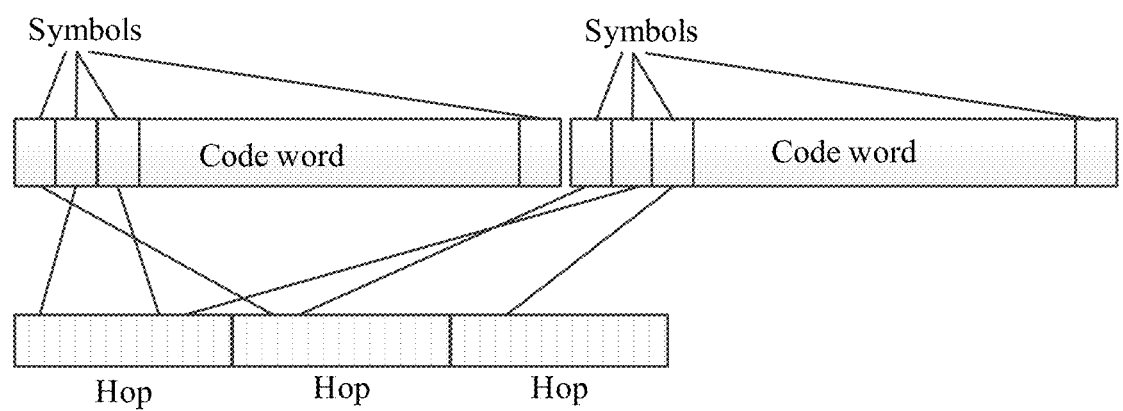
FIG. 2 illustrates a schematic relation of symbols, code words, and hops in an FH communication system.

For communication, a transmitter of the FH communication link may send a sequence of forward error correction (FEC) code words to a receiver. Each code word may consist of a plurality of symbols that need to be sent to the receiver. In the FH communication system, symbols belonging to a code word may be assigned to different hops using an interleaving process. FIG. 2 illustrates a schematic relation of symbols, code words, and hops in an FH communication system. Referring to FIG. 2, each code word may contain a plurality of symbols, and the symbols that are included in a same code word may be assigned to different hops for transmission. As a result, when a hop is affected by interference, for each FEC code word, only a small portion of the symbols will be affected.

In an RF environment with interferences, the FH communication system needs to deal with a partial band partial time (PBPT) jamming problem. In the PBPT jamming problem, the probability of a hop being affected by interference can be evaluated. For example, when the bandwidth of an interference is half of the total hopping bandwidth, the probability of a communication hop being affected by the interference is 0.5. The signal-to-noise ratio (SNR) of the communication link when affected by an interference source may be further determined by the strength of the interference. It should be noted that the SNR level of a communication link may reflect the quality of the link.

Figure 3:
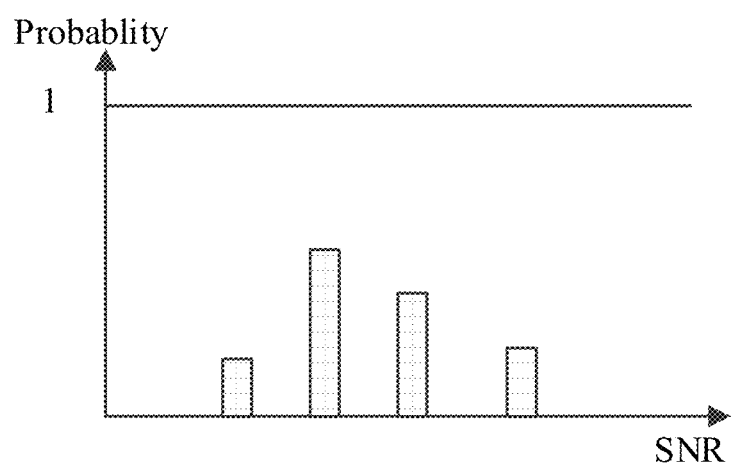
FIG. 3 illustrates a schematic distribution of signal-to-noise ratio (SNR) of communication hops in a partial band partial time (PBPT) jamming environment.

FIG. 3 illustrates a schematic distribution of the SNR of communication hops in a PBPT jamming environment. Referring to FIG. 3, the SNR conditions of the communication hops may include multiple discrete levels. Hops at the highest SNR level may correspond to the hops that are not affected by any interference, and hops at a lower SNR level may be more affected by interferences as compared to hops at a higher SNR level.

For practical applications, a FH communication system may have very high hopping rate and thus may be expensive to develop or obtain. The present disclosure provides an method for emulation of the communication performance of a SATCOM system in a PBPT environment. This method for SATCOM cognitive radio emulation uses low-cost low speed RF communication modules such as Universal Software Radio Peripheral (USRP) modules.

According to the disclosed method for emulating a communication system with fast changing link condition, for the emulation investigation of the PBPT jamming problem with a FH communication system, the emulation uses a non-hopping communication system, e.g., with USRP modules, which eliminate the system complexity for implementing frequency hopping. In addition to using the non-hopping communication system, a same SNR distribution may be created for symbols of the code words as in the PTBT jamming environment, such that performance of the non-hopping link will be the same as the performance of a communication link in a real FH communication system.

In one embodiment, the proposed method for emulating a communication system with fast changing link condition may include a communication link emulation process and an interference emulation process. Moreover, since the communication link includes a transmitter and a receiver, during the communication link emulation process, the transmitter and the receiver may operate accordingly to realize information communication. In the following, examples of the operations performed by the transmitter and the receiver will be provided to illustrate the details of the communication link emulation process.

Figure 4:
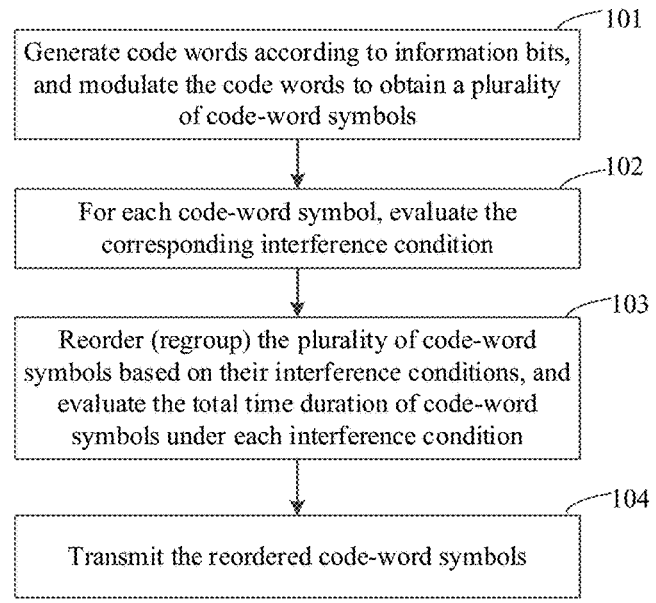
FIG. 4 illustrates a schematic operation flowchart of a communication link emulation process at a transmitter side according to an exemplary method for emulating a communication system with fast changing link condition consistent with various embodiments of the present disclosure.

FIG. 4 illustrates a schematic operation flowchart of a communication link emulation process at a transmitter side according to an exemplary method for emulating a communication system with fast changing link condition consistent with various embodiments of the present disclosure. Referring to FIG. 4, on the transmitter side, in 101, a plurality of code words may be generated using information bits and a selected channel coding scheme, e.g., an FEC coding scheme. Further, a plurality of code-word symbols may be obtained by modulating the code words according to a selected modulation type, e.g., a quadrature phase shift keying (QPSK) modulation type or an eight phase shift keying (8PSK) modulation type. It should be noted that generating code-word symbols from information bits is standard in communication systems, and because no real-time communication is required for emulation investigations, all information bits may be converted to code-word symbols in 101 for further processing. In one embodiment, the plurality of code-word symbols may be arranged in an initial symbol sequence.

In 102, the interference condition may be evaluated for each code-word symbol in the RF environment under investigation. That is, the interference condition of each code-word symbol in a PBPT jamming RF environment may be evaluated. In addition, a time duration may also be evaluated for each code-word symbol. In a subsequent process, the time duration of each code-word symbol may be used to emulate the interference environment of the RF communication link.

Figure 5:
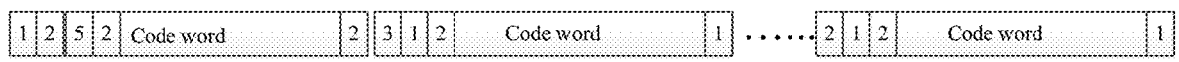
FIG. 5 illustrates a schematic diagram of assigning code-word symbols with certain SNR conditions in an exemplary method for emulating a communication system with fast changing link condition consistent with various embodiments of the present disclosure.

In one embodiment, the interference condition of a code-word symbol may be obtained by using the distribution of hop SNR as shown in FIG. 3. For example, when code-word symbols are evenly assigned to different hops, the distribution of the interference condition for each code-word symbol is the same as the distribution of hop interference condition, i.e., SNR. As a result, for each code-word symbol, a SNR condition can be assigned as a random result from the hop SNR distribution, i.e., hop interference condition distribution. FIG. 5 illustrates a schematic diagram of assigning code-word symbols with certain SNR conditions in an exemplary method for emulating a communication system with fast changing link condition consistent with various embodiments of the present disclosure. Referring to FIG. 5, the plurality of code-word symbols may be randomly assigned to different SNR conditions (e.g. different SNR levels), while the overall distribution of the SNR conditions may be consistent with the distribution shown in FIG. 3. It should be noted that digital numbers, e.g. 1, 2, . . . 5, in FIG. 5 are used to represent different SRN conditions (e.g., levels), and are not used to indicate the relative magnitudes of different SRN conditions.

In other embodiments, the interference condition of a code-word symbol may be obtained by conducting a full emulation of symbol-to-hop assignment together with an emulation of the hop interference conditions based on actual needs.

Figure 6:
FIG. 6 illustrates a schematic diagram of reordering code-word symbols according to interference conditions in an exemplary method for emulating a communication system with fast changing link condition consistent with various embodiments of the present disclosure.

Further, referring to FIG. 4, after assigning the plurality of code-word symbols to different SNR conditions, in 103, the plurality of code-word symbols may be reordered (e.g., regrouped) according to the interference conditions, and a total time duration of code-word symbols under each interference condition may be evaluated. FIG. 6 illustrates a schematic diagram of reordering code-word symbols according to interference conditions in an exemplary method for emulating a communication system with fast changing link condition consistent with various embodiments of the present disclosure. Referring to FIG. 6, after the plurality of code-word symbols are reordered based on the interference conditions, code-word symbols with the same SNR condition may be arranged together (e.g., consecutively in the reordered symbol sequence), such that code-word symbols with the same SNR condition may then be transmitted together in the emulation. For example, code-word symbols with a same SNR condition may be ordered as a group. Therefore, corresponding to the total number of different SNR conditions, a same number of groups may be obtained. The obtained symbol groups may be placed one after another to form a new sequence of the code-word symbols. It should be noted that the plurality of symbol groups may or may not be ordered based on the relative magnitude of the SNR conditions (e.g. levels). For example, the first symbol group in the reordered symbol sequence may not have the highest SNR condition or the lowest SNR condition. In addition, the relationship between the initial symbol sequence of the code-word symbols in the original code words and the reordered symbol sequence of the code-word symbols obtained after the reordering process may be saved, such that after the plurality of code-word symbols are transmitted, an inverse reordering process may be conducted at the receiver side according to the relation to recover the symbol sequence as in the original code words. Moreover, the total time duration of code-word symbols under each interference condition may be evaluated and saved.

Further, referring to FIG. 4, in 104, the plurality of code-word symbols may be transmitted according to the reordered symbol sequence obtained in 103.

Figure 7:
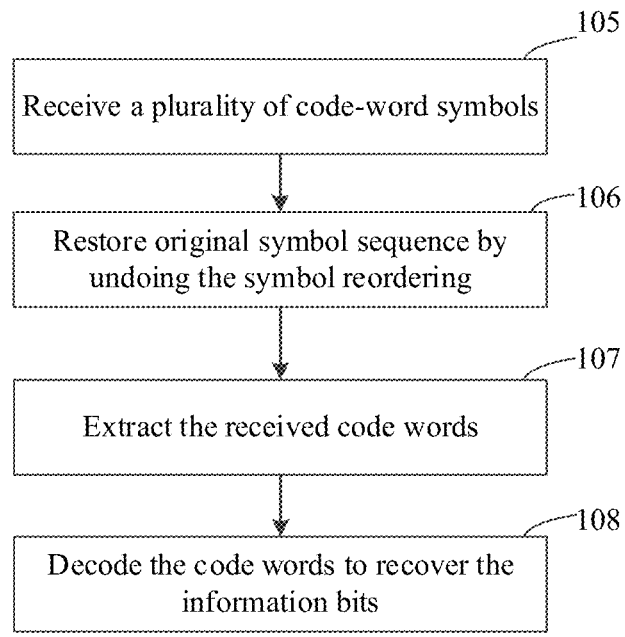
FIG. 7 illustrates a schematic operation flowchart of a communication link emulation process at a receiver side according to an exemplary method for emulating a communication system with fast changing link condition consistent with various embodiments of the present disclosure.

FIG. 7 illustrates a schematic operation flowchart of a communication link emulation process at a receiver side according to an exemplary method for emulating a communication system with fast changing link condition consistent with various embodiments of the present disclosure. Referring to FIG. 7, in 105, the receiver may receive the plurality of code-word symbols that are transmitted according to the order obtained after the reordering process. Further, in 106, the original symbol sequence (e.g. initial symbol sequence) may be recovered by conducting a reverse ordering process. That is, a process of reversing the reordering process described in 103 of FIG. 4 may be performed. In one embodiment, the relationship between the initial symbol sequence of the plurality of code-word symbols and the reordered symbol sequence of the plurality of code-word symbols obtained in 103 may be used to recover the original symbol sequence. To recover the original symbol sequence, according to the disclosed method, the relationship between the initial symbol sequence and the reordered symbol sequence saved by the transmitter may be sent to the receiver through a wired or wireless communication connection between the transmitter and the receiver. The wired or wireless communication connection between the transmitter and the receiver is established for emulation purpose, and thus may be different from the RF communication link that is used to transmit the plurality of code-word symbols.

Further, in 107, the original code words that contain the plurality of code-word symbols may be recovered at the receiver side according to the original symbol sequence recovered in 106. Then, in 108, a decoding process may be performed to recover the information bits based on the original code words recovered in 107. It should be noted that 105, 107, and 108 are standard practice in communication system receivers, which are known to those skilled in the art.

Figure 8:
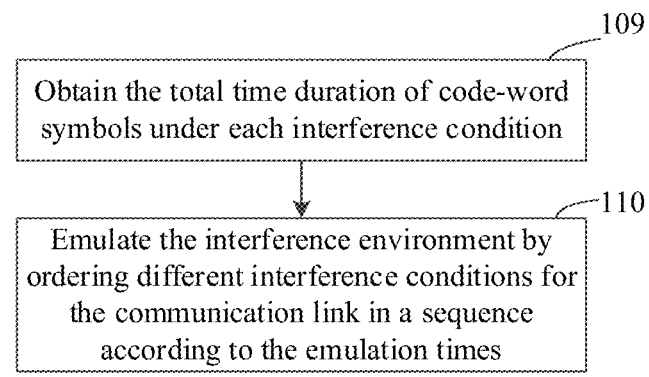
FIG. 8 illustrates a schematic flowchart of an interference emulation process according to an exemplary method for emulating a communication system with fast changing link condition consistent with various embodiments of the present disclosure.

Further, the disclosed method also includes emulation of different interference conditions in cooperation with the emulation of the communication link (including the transmitter and the receiver). FIG. 8 illustrates a schematic flowchart of an interference emulation process according to an exemplary method for emulating a communication system with fast changing link condition consistent with various embodiments of the present disclosure.

Referring to FIG. 8, in 109, the total time duration of each interference condition (e.g., interference level) may be obtained from the transmitter based on the results obtained in 103 (referring to FIG. 4), where the sequence of the plurality of code-word symbols is reordered at the transmitter side.

Figure 9:
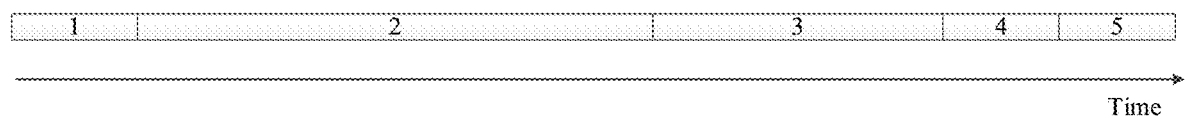
FIG. 9 illustrates a schematic time order of various SNR conditions obtained by SNR condition emulation consistent with various embodiments of the present disclosure.

Further, in 110, the time durations of different interference conditions evaluated in 109 for the communication link may be ordered in a sequence according to the reordered symbol sequence of the plurality of code-word symbols to provide an emulated interference environment for the communication link. FIG. 9 illustrates a schematic time order of various SNR conditions obtained through SNR condition emulation according to various embodiments of the present disclosure.

It should be noted that the time to start sending (transmitting) symbols and the time to start generating the emulated interference environment should be the same. That is, the communication link emulation and the interference emulation may be performed accordingly, such that the code-word symbols can always be transmitted under the corresponding SNR condition. Therefore, by ordering the code-word symbols with a same SNR condition together for transmission, the proposed method for emulating a communication system with fast changing link condition ensures symbols transmitted in the non-hopping communication link experience the same interference conditions as symbols transmitted in the to-be-investigated FH communication system in the presence of interferences. As such, the disclosed method allows emulation of fast changing RF environment conditions in FH communication systems with a non-hopping communication system and an interference source with a much lower speed. In addition, the cost for performing the emulation may also be reduced.

Figure 10:
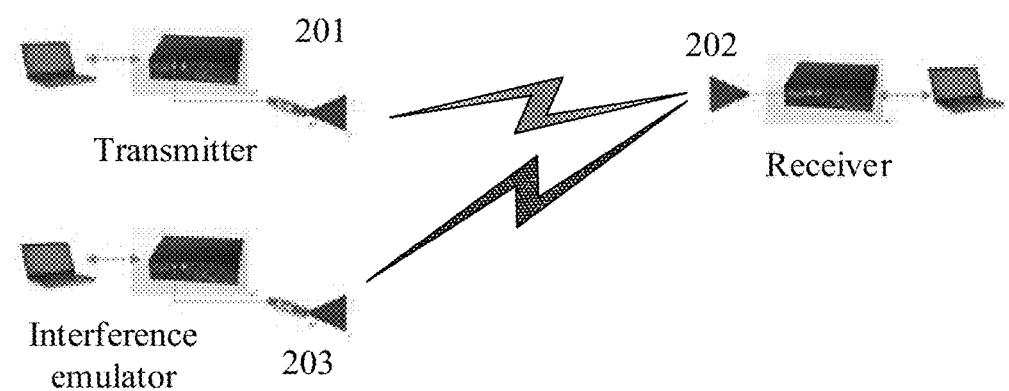
FIG. 10 illustrates a schematic diagram of an exemplary testbed system for emulating a communication system with fast changing link condition consistent with various embodiments of the present disclosure.

The present disclosure also provides a testbed system for emulating a communication system with fast changing link condition. FIG. 10 illustrates a schematic diagram of an exemplary testbed system for emulating a communication system with fast changing link condition consistent with various embodiments of the present disclosure.

Referring to FIG. 10, the testbed system may include a transmitter 201, a receiver 202, and an interference emulator 203. In one embodiment, the transmitter 201 may be an RF transmitter and the receiver 202 may be an RF receiver. The transmitter 201 and the receiver 202 may together establish an RF communication link. The interference emulator 203 may serve as an interference source to create different interference conditions in the emulation.

In one embodiment, the transmitter 201 may be configured to perform the emulation operations shown in FIG. 4. For example, the transmitter 201 may be configured to generate a plurality of code words (for the RF communication link) using information bits and a selected channel coding scheme. The selected channel coding scheme may be an FEC coding scheme. Further, the transmitter 201 may be configured to modulate the code words according to a selected modulation type, e.g., a QPSK modulation type or an 8PSK modulation type, to obtain a plurality of code-word symbols.

The transmitter 201 may be configured to further evaluate the corresponding interference condition for each code-word symbol, and then reorder (e.g., regroup) the plurality of code-word symbols according to the SNR condition. After the plurality of code-word symbols are reordered based on individual interference conditions, code-word symbols with the same SNR condition may be arranged consecutively in the reordered symbol sequence, such that code-word symbols with the same SNR condition may then be transmitted together in the emulation. For example, code-word symbols with a same SNR condition may be ordered as a group. Therefore, corresponding to the total number of different SNR conditions, a same number of groups may be obtained. The obtained symbol groups may be placed one after another to form a new sequence of the symbols. It should be noted that the plurality of symbol groups may or may not be ordered based on the relative magnitude of the SNR conditions (e.g. levels). For example, the first symbol group in the reordered symbol sequence may not have the highest SNR condition or the lowest SNR condition. In one embodiment, the transmitter 201 may also be configured to evaluate and save the time duration for each code-word symbol and then the total time duration of code-word symbols under each interference condition based on the time duration of each code-word symbol. The total time duration of code-word symbols under each interference condition may be used by the interference emulator 203 to emulate the interference environment of the RF communication link.

In one embodiment, the transmitter 201 may also be configured to save the relationship between the initial symbol sequence of the code-word symbols in the original code words and the reordered symbol sequence of the code-word symbols obtained after the reordering process. After the transmission of the plurality of code-word symbols, the relationship may be used by the receiver to recover the initial symbol sequence.

Further, the transmitter 201 may be configured to transmit the plurality of code-word symbols according to the reordered symbol sequence obtained after the plurality of code-word symbols are reordered. It should be noted that during the transmission of each code-word symbol, an interference condition corresponding to the code-word symbol may be emulated and applied to the RF communication link. As such, the code-word symbols are transmitted through an emulated non-hopping communication link. Moreover, the code-word symbols transmitted in the emulated non-hopping communication link experience the same interference conditions as the code-word symbols transmitted in the to-be-investigated FH communication system.

In one embodiment, the receiver 202 may be configured to perform the emulation operations shown in FIG. 7. For example, the receiver 202 may be configured to receive the plurality of code-word symbols that are transmitted in the reordered symbol sequence, and then conduct a reverse ordering process, using the relation between the initial symbol sequence and the reordered symbol sequence, to recover the initial symbol sequence of the plurality of code-word symbols. In one embodiment, the transmitter 201 may be configured to send the saved relation between the initial symbol sequence of the plurality of code-word symbols and the reordered symbol sequence of the plurality of code-word symbols to the receiver 202 through a wired or wireless communication connection between the transmitter 201 and the receiver 202. The wired or wireless communication connection between the transmitter 201 and the receiver 202 is established for emulation purpose, and thus may be different from the RF communication link that is used to transmit the plurality of code-word symbols.

Further, the receiver 202 may also be configured to, based on the recovered initial symbol sequence and the plurality of code-word symbols, recover the plurality of code words that is generated using the information bits, and then receiver 202 may be configured to perform a decoding process to recover the information bits based on the original code words.

In one embodiment, the interference emulator 203 may be configured to emulate various interference conditions according to the emulation operations shown in FIG. 8. For example, the interference emulator 203 may be configured to obtain the total time duration of code-word symbols under each interference condition (e.g., interference level) from the transmitter 201. Because the total time duration of code-word symbols under each interference condition may be saved by the transmitter 201, the interference emulator 203 may be configured to obtain the total time duration code-word symbols under each interference condition from the transmitter 201 through a wired or wireless communication connection between the transmitter 201 and the interference emulator 203.

Further, the interference emulator 203 may also be configured to provide an emulated interference environment for the RF communication link by ordering the time durations of different interference conditions according to the reordered symbol sequence of the plurality of code-word symbols. In one embodiment, the total time duration of code-word symbols under each interference condition and the reordered symbol sequence of the plurality of code-word symbols and may be sent from the transmitter 201 to the interference emulator 203 through the wired or wireless communication connection between the transmitter 201 and the interference emulator 203.

It should be noted that the starting time for the transmitter 201 to send (transmit) symbols and the starting time for the interference emulator 203 to generate the emulated interference environment that includes a sequence of various interference conditions should be the same, such that various interference conditions may be properly created for and applied to the corresponding symbols. That is, the RF communication link emulation and the interference emulation may be performed accordingly, such that the code-word symbols can always be transmitted under the corresponding SNR condition. In one embodiment, the wired or wireless communication connection between the transmitter 201 and the interference emulator 203 may be used to ensure that the time for the transmitter 201 to start sending (transmitting) symbols is the same as the time for the interference emulator 203 to start generating the emulated interference environment.

According to various embodiments of the present disclosure, by ordering the code-word symbols with a same SNR condition together for transmission, the proposed testbed system for emulating a communication system with fast changing link condition ensures symbols transmitted in the emulated non-hopping communication link experience the same interference conditions as symbols transmitted in the to-be-investigated FH communication system in the presence of interferences. As such, the disclosed testbed system allows emulation of fast changing RF environment conditions in FH communication systems with a non-hopping communication system and an interference source with a much lower speed. In addition, the cost for performing the emulation may also be reduced.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for emulating a communication system with fast changing link condition, applied to a testbed system that includes an interference emulator, a transmitter, and a receiver, the method comprising:
    generating, by the transmitter, a plurality of code-word symbols according to information bits, wherein the plurality of code-word symbols are ordered in an initial symbol sequence;
    evaluating, by the transmitter, an interference condition and a time duration for each code-word symbol;
    reordering, by the transmitter, the plurality of code-word symbols to a reordered symbol sequence based on interference conditions, and evaluating, by the transmitter, a total time duration of code-word symbols under each interference condition, wherein the code-word symbols with a same interference condition are arranged together in the reordered symbol sequence;
    transmitting, by the transmitter, the plurality of code-word symbols in the reordered symbol sequence;
    obtaining, by the interference emulator, the total time duration of the code-word symbols under each interference condition from the transmitter; and
    providing, by the interference emulator, an emulated interference environment by ordering time durations of different interference conditions in a sequence according to the reordered symbol sequence of the plurality of code-word symbols, wherein:
        a start time of transmitting, by the transmitter, the code-word symbols with an interference condition is synchronized with a start time of emulating, by the interference emulator, the interference condition.

2. The method according to claim 1, wherein generating, by the transmitter, the plurality of code-word symbols according to the information bits includes:
    generating, by the transmitter, a plurality of code words using the information bits and a selected channel coding scheme; and
    obtaining, by the transmitter, a plurality of code-word symbols by modulating the plurality of code words according to a selected modulation type.

3. The method according to claim 2, wherein:
    the selected channel coding scheme includes a forward error correction (FEC) coding scheme.

4. The method according to claim 2, wherein:
    the selected modulation type includes a quadrature phase shift keying (QPSK) modulation type or an eight phase shift keying (8PSK) modulation type.

5. The method according to claim 2, further including:
    saving, by the transmitter, a relationship between the initial symbol sequence and the reordered symbol sequence;
    receiving, by the receiver, the plurality of code-word symbols transmitted by the transmitter in the reordered symbol sequence;
    recovering, by the receiver, the initial symbol sequence of the plurality of code-word symbols;
    recovering, by the receiver and according to the initial symbol sequence and the plurality of code-word symbols, the plurality of code words generated using the information bits and the selected channel coding scheme; and
    recovering, by the receiver and according to the plurality of code words, the information bits based on the plurality of code words.

6. The method according to claim 5, wherein recovering, by the receiver, the initial symbol sequence of the plurality of code-word symbols includes:
    obtaining, by the receiver, the relationship between the initial symbol sequence and the reordered symbol sequence from the transmitter through a wired or wireless connection between the receiver and the transmitter; and
    recovering, by the receiver, the initial symbol sequence of the plurality of code-word symbols according to the relationship between the initial symbol sequence and the reordered symbol sequence.

7. The method according to claim 6, wherein:
    the transmitter and the receiver establish a communication link, including a radio-frequency (RF) communication link, and
    the wired or wireless connection between the receiver and the transmitter is different from the RF communication link.

8. The method according to claim 1, further including:
    obtaining, by the interference emulator, the total time duration for transmitting code-word symbols under the interference condition from the transmitter through a wired or wireless connection between the transmitter and the interference emulator.

9. A testbed system for emulation of communication system with fast changing link condition, comprising:
    a transmitter and a receiver, at least establishing a radio-frequency (RF) communication link; and
    an interference emulator, wherein:
    the transmitter is configured to:
        generate a plurality of code-word symbols according to information bits, wherein the plurality of code-word symbols are ordered in an initial symbol sequence, evaluate an interference condition and a time duration for each code-word symbol, reorder the plurality of code-word symbols to a reordered symbol sequence based on interference conditions, and evaluate a total time duration of code-word symbols under each interference condition, wherein the code-word symbols with a same interference condition are arranged together in the reordered symbol sequence, and transmit the plurality of code-word symbols in the reordered symbol sequence;

the interference emulator is configured to:

obtain the total time duration of the code-word symbols under each interference condition from the transmitter, and provide an emulated interference environment by ordering time durations of different interference conditions in a sequence according to the reordered symbol sequence of the plurality of code-word symbols; and a start time for the transmitter to transmit the code-word symbols with an interference condition by is synchronized with a start time for the interference emulator to emulate the interference condition.

10. The testbed system according to claim 9, wherein the transmitter is further configured to:

generate a plurality of code words using the information bits and a selected channel coding scheme; and obtain a plurality of code-word symbols by modulating the plurality of code words according to a selected modulation type.

11. The testbed system according to claim 10, wherein: the selected channel coding scheme includes a forward error correction (FEC) coding scheme.

12. The testbed system according to claim 10, wherein: the selected modulation type includes a quadrature phase shift keying (QPSK) modulation type or an 8PSK modulation type.

13. The testbed system according to claim 10, wherein: the transmitter is further configured to save a relationship between the initial symbol sequence and the reordered symbol sequence; and the receiver is configured to:

receive the plurality of code-word symbols transmitted by the transmitter in the reordered symbol sequence, recover the initial symbol sequence of the plurality of code-word symbols, recover, according to the initial symbol sequence and the plurality of code-word symbols, the plurality of code words generated using the information bits and the selected channel coding scheme, and recover, according to the plurality of code words, the information bits based on the plurality of code words.

14. The testbed system according to claim 13, wherein the receiver is further configured to:

obtain the relationship between the initial symbol sequence and the reordered symbol sequence from the transmitter through a wired or wireless connection between the receiver and the transmitter; and recover the initial symbol sequence of the plurality of code-word symbols according to the relationship between the initial symbol sequence and the reordered symbol sequence.

15. The testbed system according to claim 14, wherein: the wired or wireless connection between the receiver and the transmitter is different from the RF communication link established between the transmitter and the receiver.

16. The testbed system according to claim 9, wherein the interference emulator is further configured to:

obtain the time duration of all code-word symbols under the interference condition from the transmitter through a wired or wireless connection between the transmitter and the interference emulator.

\* \* \* \* \*